(12) United States Patent
Mak

(10) Patent No.: US 9,910,705 B1
(45) Date of Patent: Mar. 6, 2018

(54) MODULAR OFFLOADING FOR COMPUTATIONALLY INTENSIVE TASKS

(71) Applicant: Altera Corporation, San Jose, CA (US)

(72) Inventor: Hong Beng Mak, Bukit Minyak (MY)

(73) Assignee: ALTERA CORPORATION, San Jose, CA (US)

( * ) Notice: Subject to any disclaimer, the term of this patent is extended or adjusted under 35 U.S.C. 154(b) by 21 days.

(21) Appl. No.: 14/624,951

(22) Filed: Feb. 18, 2015

(51) Int. Cl.
*G06F 9/46* (2006.01)
*G06F 9/50* (2006.01)
*G06F 21/57* (2013.01)

(52) U.S. Cl.
CPC ............... *G06F 9/50* (2013.01); *G06F 21/57* (2013.01); *G06F 2221/03* (2013.01)

(58) Field of Classification Search
None
See application file for complete search history.

(56) References Cited

U.S. PATENT DOCUMENTS

| 7,546,441 B1* | 6/2009 | Ansari | G06F 9/30181 712/220 |
|---|---|---|---|
| 2008/0065835 A1* | 3/2008 | Iacobovici | G06F 12/0817 711/141 |
| 2010/0241758 A1* | 9/2010 | Oddie | G06Q 10/06 709/231 |
| 2013/0117486 A1* | 5/2013 | Daniel | G06F 13/40 710/300 |
| 2014/0059390 A1* | 2/2014 | Nulkar | G06F 11/26 714/37 |
| 2014/0298061 A1* | 10/2014 | Volvovski | G06F 3/0625 713/323 |
| 2015/0046679 A1* | 2/2015 | Gathala | G06F 9/3885 712/30 |
| 2015/0234698 A1* | 8/2015 | Chan | G06F 11/0772 714/57 |

OTHER PUBLICATIONS

Altera; SoC FPGA Dedicated Peripherals Advance Informaiton Brief; Oct. 2011.*

* cited by examiner

*Primary Examiner* — Dong Kim
(74) *Attorney, Agent, or Firm* — Fletcher Yoder, P.C.

(57) ABSTRACT

Systems and methods are provided for configuring a programmable integrated circuit device. A hard processor region of the programmable integrated circuit device includes a processor that identifies one or more tasks for assigning to an offload region of the programmable integrated circuit. The processor in the hard processor region transmits an instruction to the offload region. The plurality of offload nodes in the offload region are configured to perform the one or more tasks.

17 Claims, 6 Drawing Sheets

MODULAR OFFLOADING FOR COMPUTATIONALLY INTENSIVE TASKS

FIELD OF THE DISCLOSURE

This disclosure relates to integrated circuit devices, such as field programmable gate array (FPGA) devices, and systems and methods for offloading computationally intensive tasks to offload regions on such devices.

BACKGROUND OF THE DISCLOSURE

Many-core and multi-core devices provide a way to increase performance of a device without incurring the cost of increasing clock speeds. Many-core devices may include dedicated ASIC blocks for hardware specific functions that are often referred to as hardware accelerators. Programmable logic devices (PLDs) (e.g., field programmable gate arrays (FPGAs)), complex programmable logic devices (CPLDs), field programmable system on a chips (FPSCs), or other types of programmable devices) generally include programmable logic blocks which may be configured to implement various operations. Some PLDs also include configurable embedded hardware to support additional operations. However, conventional approaches to configuring such embedded hardware are often cumbersome and unwieldy.

One limitation of existing many-core and multi-core systems is that the topology and node configuration of the system is fixed. In these systems, tasks are run separately, and physical copies of data are passed between computing nodes and applications, which is inefficient. Accordingly, there is a need for an improved approach to configuring hardware resources of a PLD.

SUMMARY OF THE DISCLOSURE

In light of the above, the present disclosure relates to a programmable integrated circuit device that includes an offload region with a flexible topology that can be configured at execution time.

In accordance with embodiments of the present disclosure, there is provided a method of configuring a programmable integrated circuit device. The method includes identifying, by a processor in a hard processor region of the programmable integrated circuit device, one or more tasks for assigning to an offload region of the programmable integrated circuit device. The processor in the hard processor region transmits an instruction to the offload region, and a plurality of offload nodes in the offload region are configured to perform the one or more tasks.

In some embodiments, the processor in the hard processor region is a first processor, both the first processor and a second processor in the offload region are configured to asynchronously access a memory in the hard processor region. The configuring the plurality of offload nodes may include configuring one or more data flow paths through at least a subset of the plurality of offload nodes. In some embodiments, the one or more tasks include processing security content, and the processing of security content is assigned to the offload region to reduce a likelihood of a hacker attack on the programmable integrated circuit device. The plurality of offload nodes in the offload region may be modified by adding a new offload node to the plurality of offload nodes, removing an offload node from the plurality of offload nodes, or replacing an offload node in the plurality of offload nodes.

In accordance with embodiments of the present disclosure, there is provided a programmable integrated circuit device having a hard processor region and an offload region coupled to each other. The hard processor region has a first processor that identifies one or more tasks that are assigned to the offload region and transmits an instruction to the offload region. The offload region includes a plurality of offload nodes that are configured to perform the one or more tasks.

In some embodiments, the hard processor region comprises a memory, and the processor in the hard processor region another processor in the offload region are configured to asynchronously access the memory. The instruction may include how to configure one or more data flow paths through at least a subset of the plurality of offload nodes. In an example, the one or more tasks include processing security content, and the processing of security content is assigned to the offload region to reduce a likelihood of a hacker attack on the integrated circuit device.

In some embodiments, partial reconfiguration of the offload nodes is used, such that the plurality of offload nodes in the offload region are configured to be modified by adding a new offload node to the plurality of offload nodes, removing an offload node from the plurality of offload nodes, or replacing an offload node in the plurality of offload nodes. At least one of the plurality of offload nodes may be implemented as a hard intellectual property block, where the hard intellectual property block includes a layout of reusable hardware having a specified application function. The specified application function may be selected from the group: cryptographic function, a frequency transform function, a prime factorization function, a compression or decompression function, a mathematical function, a hash function, and an Ethernet function.

In some embodiments, at least one field programmable gate array is used to implement the offload region. The offload region may further include a second memory that is accessible to each offload node in the offload region, and the second memory in the offload region may be partitioned in accordance with the instruction.

BRIEF DESCRIPTION OF THE FIGURES

Further features of the disclosure, its nature and various advantages will be apparent upon consideration of the following detailed description, taken in conjunction with the accompanying drawings, in which like referenced characters refer to like parts throughout, and in which.

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments; however, the figures may not necessarily not show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

General purpose processors are not suitable for special purpose tasks because they commonly use general purpose instruction sets. For example, performing a 25 complicated hash on a large file may take a general purpose processor more than ten seconds. A similar task may be hardware accelerated on a modular offload engine (having a customized instruction set) in an FPGA or ASIC and may take a fraction of a second.

The present disclosure describes a heterogeneous many-core FPGA solution that may be used for servers and cloud data centers to dynamically customize applications and usage models, and to provide hardware acceleration for computing processes. The present disclosure allows for the topology and node configuration of a heterogeneous system to be configurable at execution time. Such a configurable system allows for parallel processing and flexible pipe staging of various tasks.

Figure 1:
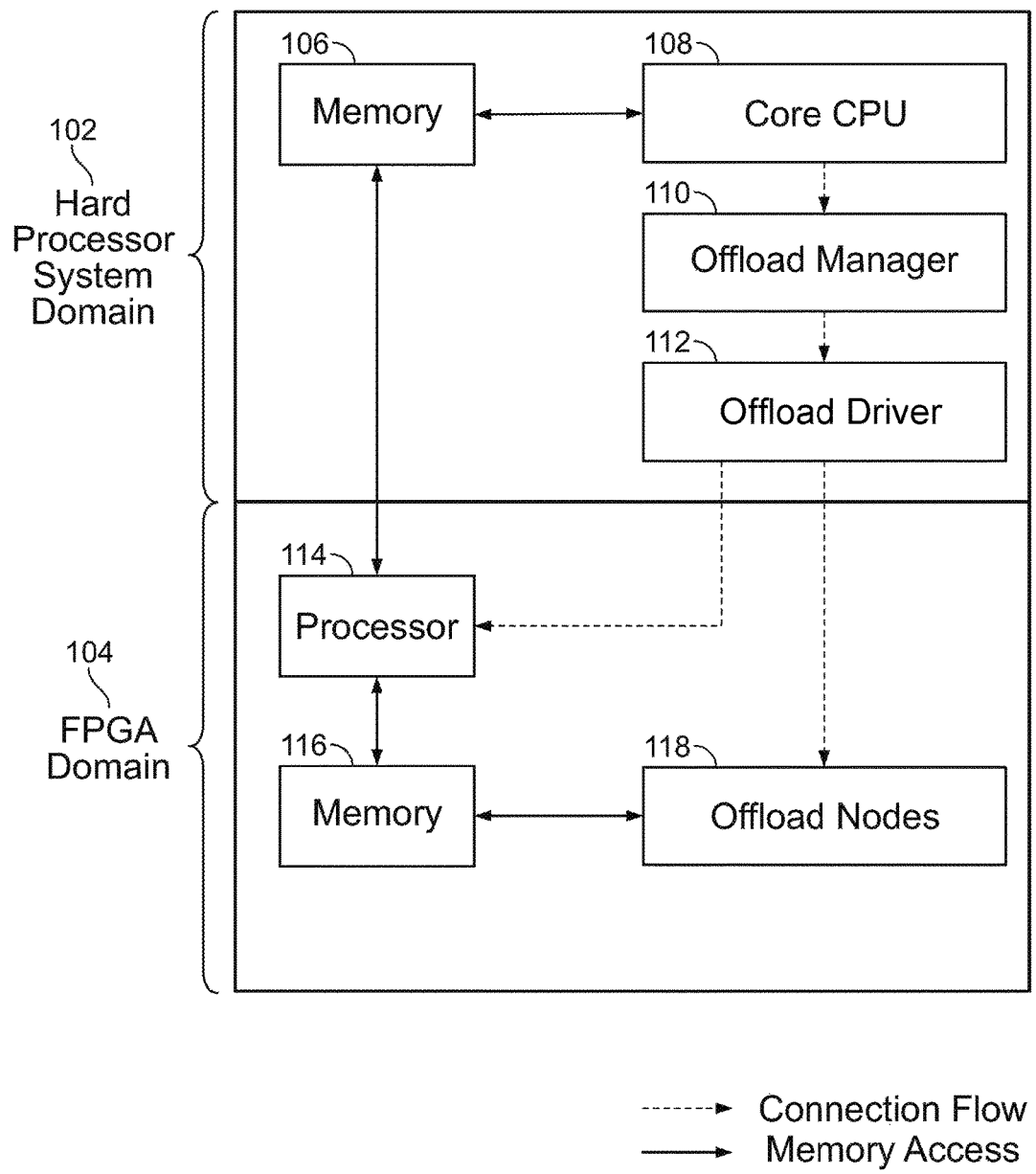
FIG. 1 shows a diagram of a system that assigns computationally intensive tasks to be performed at an offload region, in accordance with some embodiments of the present disclosure.

FIG. 1 is a block diagram of a system 100 divided into two components represented by a hard processor system (HPS) domain 102 and an FPGA domain 104. The HPS domain 102 includes a memory 106, a core CPU 108, an offload manager 110, and an offload driver 112. The FPGA domain 104 includes a processor 114, a memory 116, and a cluster of offload nodes 118. Some tasks that are assigned to be performed by the system 100 may be computationally intensive for the HPS domain 102 to handle by itself. In this case, the HPS domain 102 may offload certain tasks to the cluster of offload nodes 118 in the FPGA fabric.

An offload node may include a hard intellectual property (IP) block that is configurable at execution time. In particular, the topology of the offload nodes 118 may be configured at execution time. The topology defines the various connections between pairs of the offload nodes 118 and defines the inputs and outputs of the connections. By allowing the topology to be configured at execution time, the same set of offload nodes 118 may be able to be configured in multiple ways depending on the desired functionality. In this manner, the set of offload nodes 118 is flexible and can be used in many different situations. Moreover, the FPGA fabric may be hardware accelerated by using one or more hard IP blocks as the offload nodes 118.

Although the system 100 is shown and described as having an FPGA domain 104, it should be understood that the system 100 and other systems discussed herein may have other types of integrated circuits (IC) instead of or in addition to one or more FPGAs. It should also be understood that the systems and methods discussed herein as applying to FPGAs may be equally applicable to ICs of other types, such as application-specific integrated circuits (ASICs), application specific standard products (ASSPs), and other programmable logic devices (PLDs). For example, in some embodiments, the system 100 may include ASIC and/or off-the-shelf ASSP dies. In some embodiments, a combination of FPGA and ASIC/ASSP may be used, assuming such FPGA and ASIC/ASSP dies have compatible electrical interfaces.

One or more components of the FPGA domain 104 may be implemented with hardware IP blocks, which may include a layout of reusable hardware having a specified application function. One or more types of hard IP blocks may be implemented in the system 100. Examples of these hard IP blocks that may be included in the set of offload nodes 118 are described in detail in relation to FIGS. 2-4. The FPGA domain 104 may be implemented using a system-on-chip (SoC) FPGA, whose hard IP may include an embedded multicore processor subsystem.

In some implementations, the core CPU 108 of the HPS domain 102 includes a number of nodes, each of which may correspond to an instance of an operating system. The processor 114 of the FPGA domain 104 may include any number of embedded processors, such as a NIOS II processor. As shown in FIG. 1, both the core CPU 108 and the processor 114 access the memory unit 106. By allowing both processors in the HPS domain 102 and the FPGA domain 104 to access the same shared memory 106, there is no need to pass physical copies of data stored in the memory 106 between the two domains. Instead, memory pointers may be passed between the two domains, thereby reducing transmission costs associated with passing of data between the HPS domain 102 and the FPGA domain 104. In some embodiments, a mechanism to prevent data contention is used for the CPU 108 and the processor 114. For example, a mutex locking mechanism may be used such that the CPU 108 and the processor 114 are prohibited from concurrently accessing the memory 106. In this manner, the "zero copy" mechanism of the shared memory 106 avoids the need for computing nodes to pass physical copies back and forth in the pipeline, thereby improving overall system performance.

The offload manager 110 receives data from the core CPU 108 and handles construction of pipes and redirectors for forming connections between the various nodes in the cluster of offload nodes 118. The offload manager 110 also ensures that the constructed pipes and redirectors adhere to one or more offload policies. In an example, a Fibonacci computing node in the cluster of offload nodes 118 may be configured to have a loopback connection, but other types of nodes may not be configured to handle loopback connections. By ensuring that appropriate nodes, such as Fibonacci nodes, have the proper types of connections, the offload manager 110 ensures that the connections between nodes in the cluster of offload nodes 118 comply with such policies. The offload manager 110 also constructs the data flow path that defines the manner in which data flows through the offload nodes 118 or a subset thereof.

In some embodiments, the offload manager 110 uses multi-core APIs to configure the connections for at least a subset of the nodes within the cluster of offload nodes 118. The offload manager 110 communicates instructions for configuring these connections to the offload driver, which essentially serves as an interface between the offload manager 110 in the HPS domain 102 and the processor 114 in the FPGA domain 104, and also between the offload manager 110 and the cluster of offload nodes 118 in the FPGA domain. This interface may include OpenCL APIs that pass along tasks to the offload nodes 118 in the FPGA domain 102. In this manner, the offload manager 110 constructs the path over which data flows through the cluster of offload nodes 118, while ensuring that the nodes adhere to one or more policies. As is shown in FIG. 1, the offload manager 110 and the offload driver 112 are shown as two separate entities within the HPS domain 102, but may be included in the same entity without departing from the scope of the present disclosure.

The offload driver 112 instructs the processor 114 to load the data for each of the offload nodes 118 that will be used in the desired configuration. In particular, the processor 114 may be instructed by the offload driver 112 to load the appropriate data from the shared memory 106 into the memory 116. The instruction received from the offload driver 112 may refer to pointers to addresses in the shared memory 106. By loading data from the shared memory 106 into the memory 116, the processor 114 allows for the appropriate data to be read by the offload nodes 118.

In some implementations, the memory 116 is partitioned and managed by the processor 114. For example, the processor 114 may partition the memory 116 according to the set of offload nodes 118 or those offload nodes 118 that will be used in a particular configuration. The memory 116 may be partitioned to reserve a portion of the memory to be dedicated for each offload node for its usage, such as configuration and data exchange.

The various offload nodes 118 may be chained and connected to efficiently perform a list of complicated tasks. The flow of the tasks is configurable such that the offload nodes 118 may be piped together at execution time. In an example, OpenCL may be used to allow the application layer to use the set of offload nodes 118 in the FPGA fabric for more computing power using task-based parallelism. Example configurations of the offload nodes 118 are described in more detail in relation to FIGS. 2-4.

Figure 2:
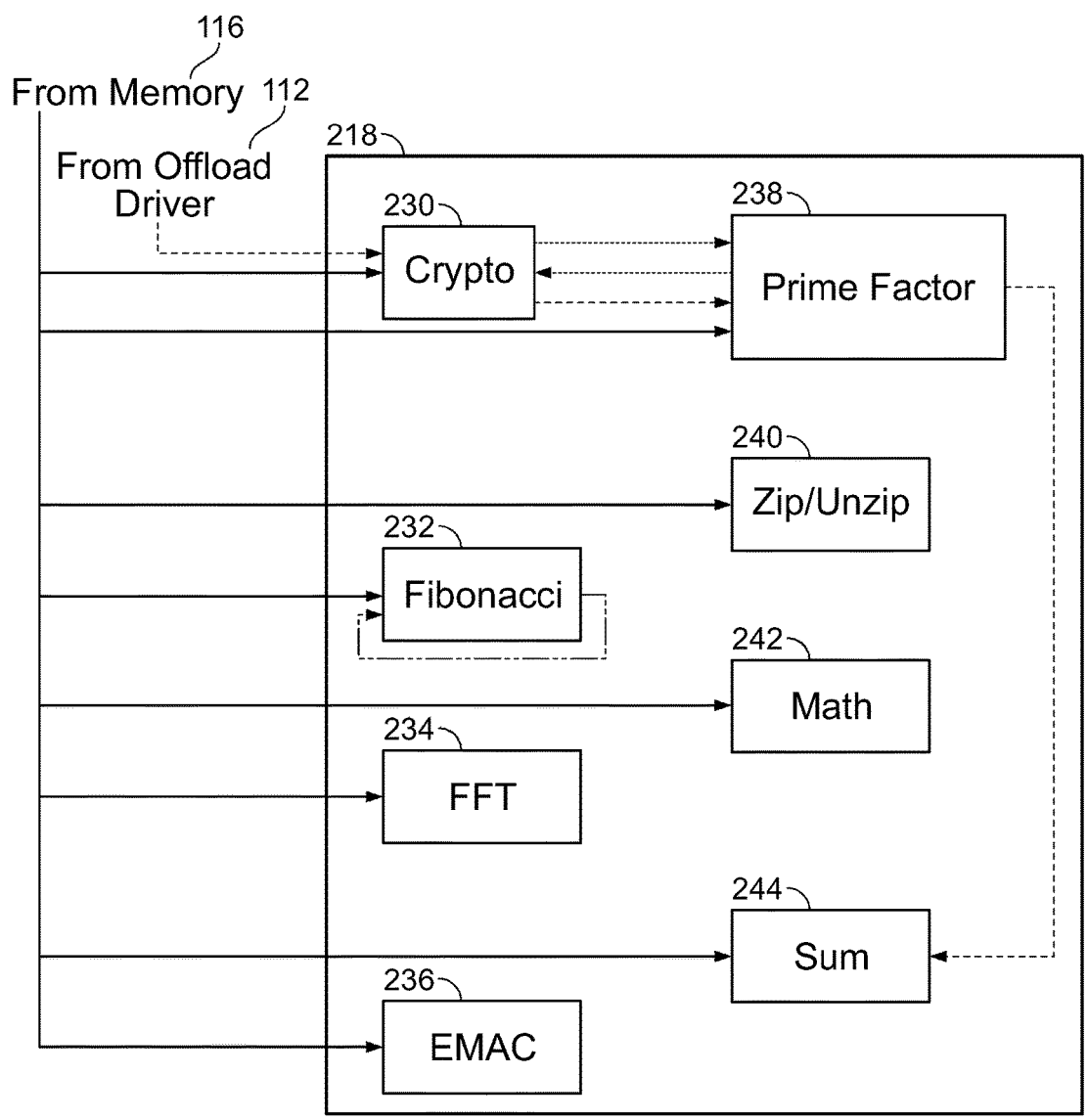
FIG. 2 shows a diagram of an offload region having a set of offload nodes to perform assigned tasks, in accordance with some embodiments of the present disclosure.

FIG. 2 is a block diagram of a system 200 having an example configuration of a cluster of offload nodes 218 that may replace the offload nodes 118 in FIG. 1. As is shown in FIG. 2, a set of eight offload nodes are included in the cluster, and each node performs a specific function. As was described above, the connections between the various nodes of FIG. 2 are set at execution time by the offload manager 110 and the offload driver 112.

As is shown in FIG. 2, the offload nodes 218 include a crypto node 230, a Fibonacci node 232, a Fast Fourier Transform (FFT) node 234, an Ethernet MAC (EMAC) node 236, a prime factor node 238, a zip/unzip node 240, a math node 242, and a hash node 244. As was described in relation to FIG. 1, the offload manager 110 configures the various connections between the offload nodes 218 in FIG. 2. In particular, the offload manager 110 may set the different types of connections, such as data flow, memory access loop back flow, and back door connect types of connections. The different types of connections may be set up by the offload manager 110 based on the time at which the offload nodes are to be used. For example, the crypto node 230 and the prime factor node 238 may use the back door connections so that the nodes 230 and 238 may communicate with each other for testing and debugging purposes.

In FIG. 2, each offload node 230-244 has access to the memory 116 over memory access connections, but not all the offload nodes 218 are used to process data. Data is passed from the offload driver 112 to the crypto node 230, to the prime factor node 238, and finally to the hash node 244. The Fibonacci node 232 has a loop back flow connection, meaning that the Fibonacci node 232 has an input from its own output port. Moreover, the connections between crypto node 230 and the prime factor node 238 are backdoor connections. The crypto node 230 may perform encryption and/or decryption of the incoming data using a public key and/or a private key. The prime factor node 238 may be configured to generate public/private key pairs for the crypto node 230 to use. In this manner, the back door connections between the crypto node 230 and the prime factor node 238 may be used for testing and debugging. The offload manager 110 keeps track of these different types of connections and which nodes should be connected or piped together in what manner.

In some implementations the offload nodes 218 include multiple instances of an identical computing node. For example, the FFT node 234 may be replicated multiple times so as to provide parallel computing. FIG. 2 provides an exemplary block diagram of the various connections that may be configured between the offload nodes 218. The connections in FIG. 2 may be dynamically configured and represent a general example of modular offloading for computationally intensive tasks.

Figure 3:
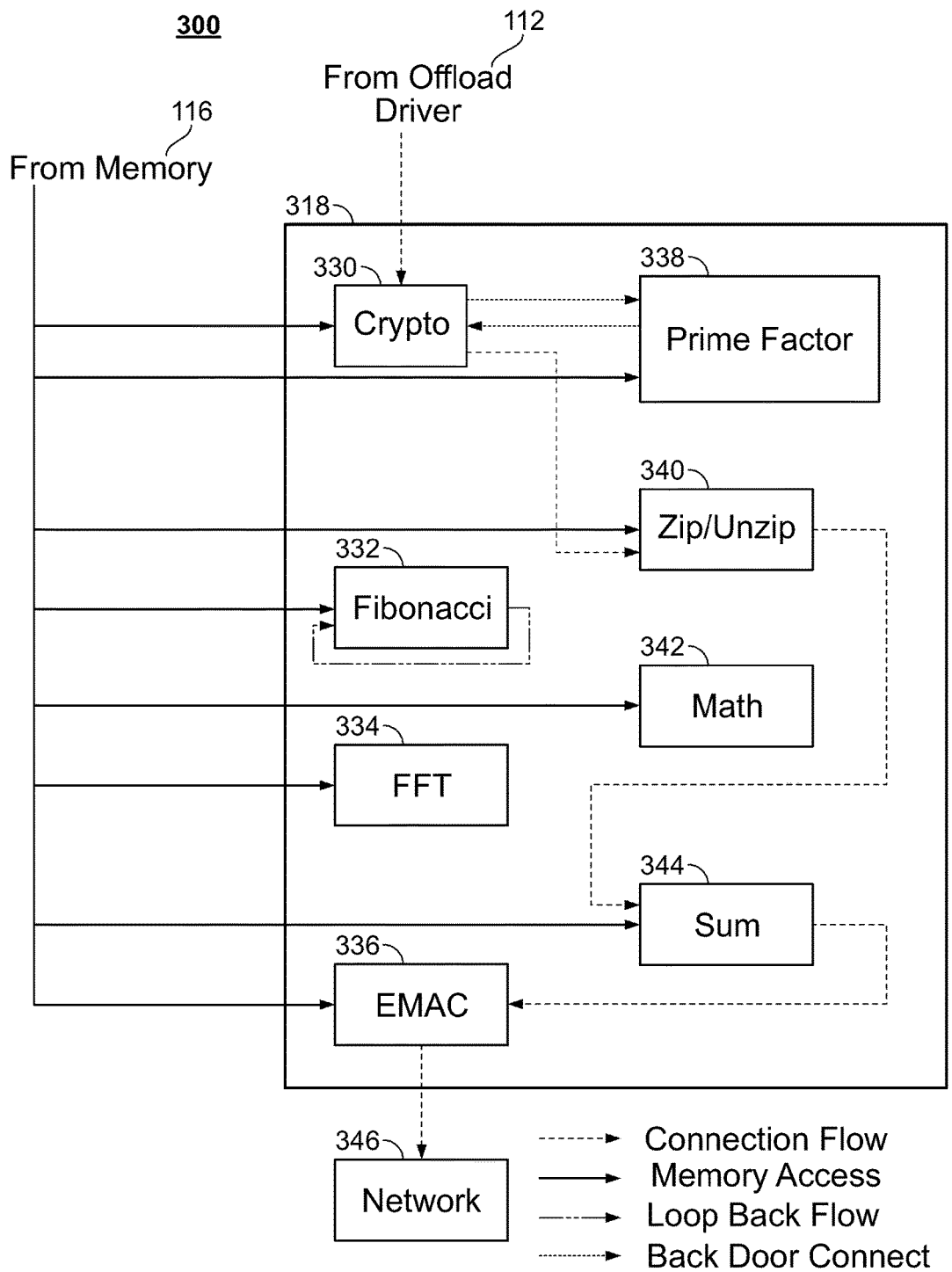
FIG. 3 shows a diagram of an offload region having a set of offload nodes to perform processing of security content, in accordance with some embodiments of the present disclosure.

FIG. 3 is a block diagram of a system 300 having an example configuration of a cluster of offload nodes 318 for processing security content. The offload nodes 318 are the same as the offload nodes 218 shown in FIG. 2 (i.e., including a crypto node 330, a Fibonacci node 332, an FFT node 334, an EMAC node 336, a prime factor node 338, a zip/unzip node 340, a math node 342, and a hash node 344), but the configuration of the offload nodes 318 of FIG. 3 is different from the configuration of the offload nodes 218 of FIG. 2. In particular, the same set of offload nodes may be used for both sets 218 and 318, but depending on the desired functionality, the same set of offload nodes may be connected in different manners so as to execute different tasks. In FIG. 2, data flows from the offload driver 112 to the crypto node 230 to the prime factor node 238 and to the hash node 244. In contrast, the data flow is configured differently in FIG. 3, in which, data flows from the offload driver 112 to the crypto node 330, to the zip/unzip node 340, to the hash node 344, to the EMAC node 336, and to the network 346.

One application of the example configuration in FIG. 3 may involve the core CPU 108 assigning the processing of security content to the FPGA domain 104. The core CPU 108 may assign such a task to the FPGA domain 104 to free up the HPS domain 102 to handle other tasks, such as operating system tasks. In particular, it may be desirable to offload the processing of security content to the FPGA domain 104 to prevent hacker attacks. By using the offload nodes 318 to process the security content, a tamper resistance system is used to prevent hacker attacks. In particular, in the FPGA domain 104, the offload nodes 318 are implemented at the level of hardware gates, which is more difficult to attack, compared to the software that may be implemented in the HPS domain 102. To attack the software, a hacker may simply use a powerful debugger to trace or step through the software functions, while attacking the hardware implementation in the FPGA domain 104 is more complex.

Any or all of the offload nodes 318 of FIG. 3 may be implemented as hard IP blocks. In the example shown in FIG. 3, the crypto node 330 may include a hardware crypto engine that accelerates applications that need cryptographic functions. After the data has been compressed or uncompressed by the zip/unzip node 340, the hash node 344 computes a hash function on the data. In some implementations, the hash node 344 performs a cipher process, such as data encryption standard/advanced encryption standard, kasumi, snow3G, md5 (e.g., a md5sum), sha1 (e.g., a sha1sum), sha2, or any other process to calculate and verify a hash of the data. Then, the EMAC node 336 sends data for publishing to a network 346, which may correspond to the world wide web, or any other suitable network.

Figure 4:
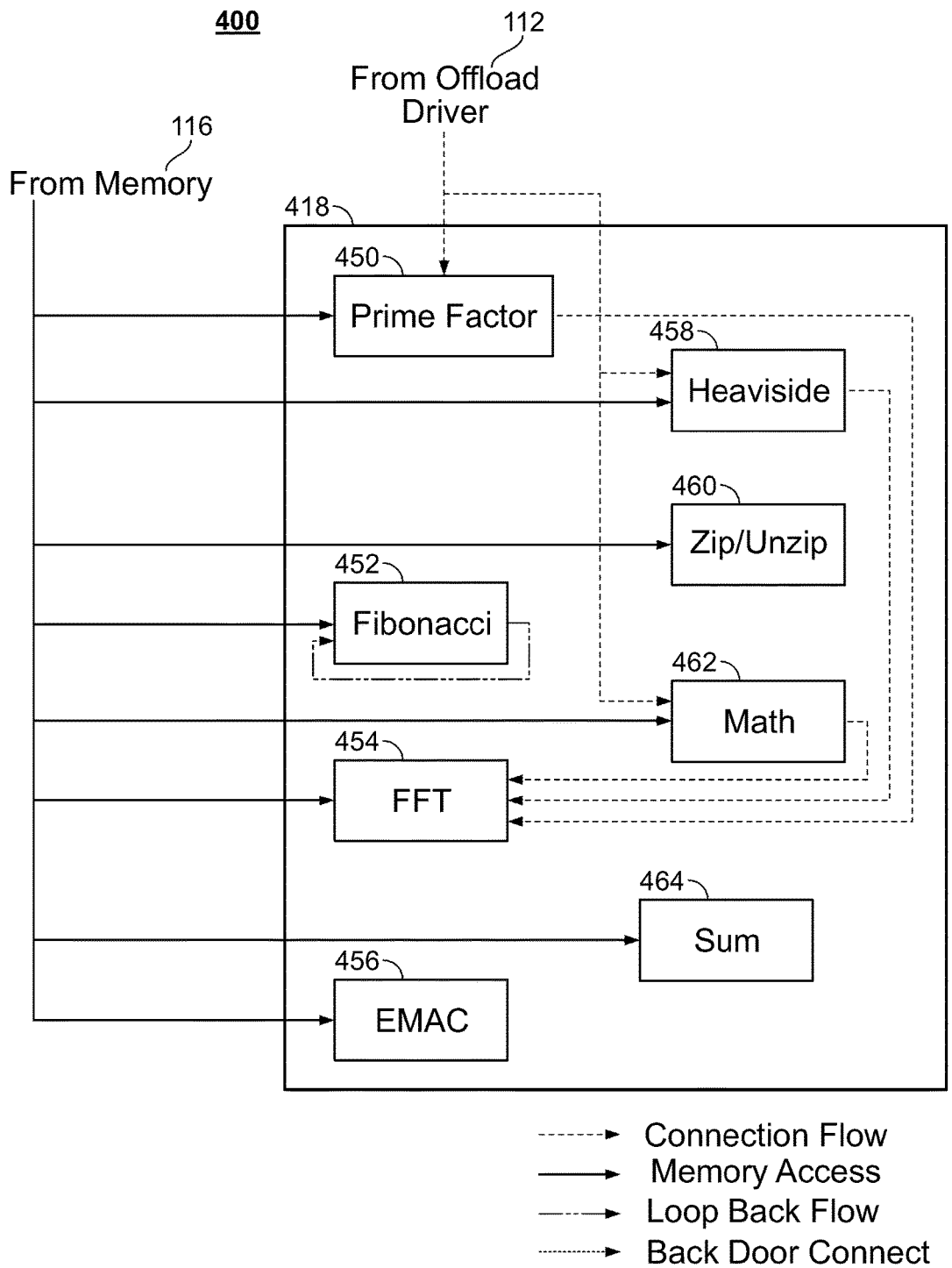
FIG. 4 shows a diagram of an offload region having a set of offload nodes to perform parallel mathematical processing, in accordance with some embodiments of the present disclosure.

FIG. 4 is a block diagram of a system 400 having an example configuration of a cluster of offload nodes 418 for performing mathematical operations. The offload nodes 418 include a prime factor node 450, a Fibonacci node 452, an FFT node 454, an EMAC node 456, a Heaviside node 458, a zip/unzip node 460, a math node 462, and a hash node 464. As described above, one or more of these nodes may be implemented as a hard IP block that is configurable at execution time.

For example, the core CPU 108 determines that certain tasks that are CPU-intensive should be passed over to the FPGA domain 104. Examples of CPU-intensive tasks include but are not limited to prime factoring of a large integer, mathematic arctan and Heaviside step functions, and FFT computations. In general, any task that is computationally expensive or slow for the HPS domain 102 to handle on its own may be passed over to the FPGA domain 104.

In the example shown in FIG. 4, there are three parallel data flow paths from the offload driver 112 to the prime factor node 450, the Heaviside node 458, and the math node 462, which may be a hard IP block configured to perform an arctan computation. Data flows out of each of these three nodes 450, 458, and 462 to the FFT node 454. As is shown in FIG. 4, the prime factor node 450, the Heaviside node 458, and the math node 462 may perform prime factor, Heaviside, and arctan computations in parallel because these computations are independent of one another. By allowing for parallel computations, the set of offload nodes 418 save significantly on time In some implementations, partial reconfiguration is used to add, replace, or modify any of the offload nodes 118, 218, 318, or 418. In particular, one or more hard IP blocks may be added to a set of existing offload nodes, or any of the existing hard IP blocks in the offload nodes may be modified or replaced. As used herein, partial reconfiguration refers the ability to reconfigure the logic on a region on a chip on the fly. In this way, partial reconfiguration allows for the modification to the set of offload nodes without necessarily requiring downtime from other components of the chip. Partial reconfiguration is especially useful if there is a limited amount of FPGA resource space in the FPGA domain 104. However, one potential disadvantage of using partial reconfiguration to address FPGA resource limitations is that there may be some penalty in the form of a wait time delay if the IP blocks are being reconfigured during run time.

Figure 5:
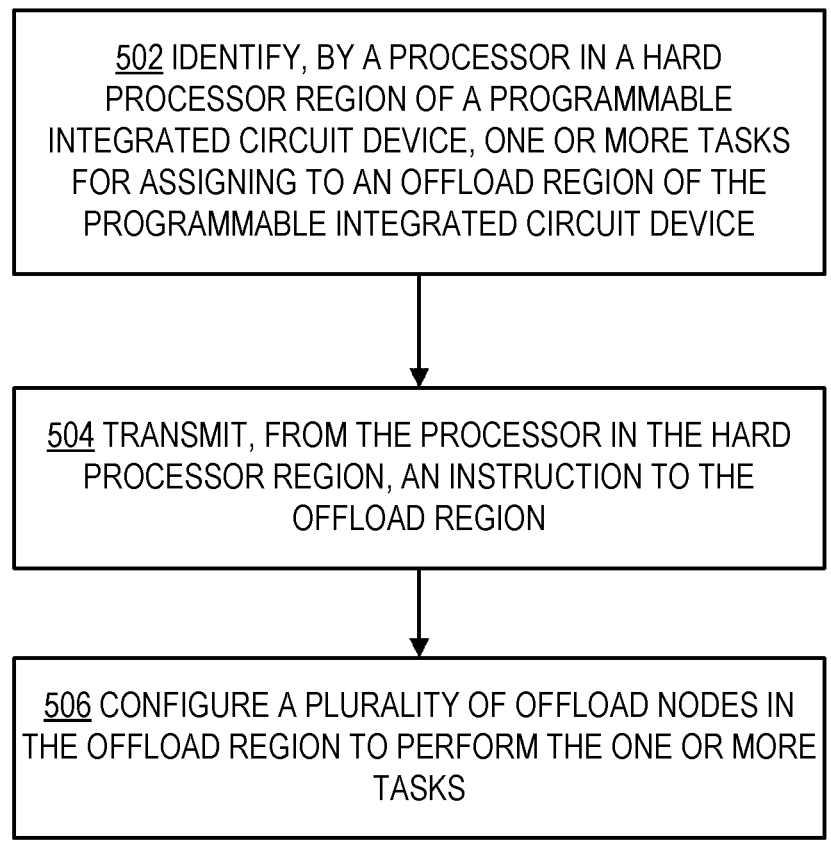
FIG. 5 shows an illustrative flow diagram of a process for configuring an offload region of a programmable integrated circuit device, in accordance with some embodiments of the present disclosure.

FIG. 5 shows an illustrative flow diagram of a process 500 for configuring a set of offload nodes, according to an illustrative embodiment. The process 500 may be performed on an integrated circuit device, such as an FPGA device, an ASIC device, an ASSP device, or a PLD. The process 500 may be used for servers and cloud data centers to dynamically customize applications and usage models, and to provide hardware acceleration for computing processes. The process 500 allows for the topology and node configuration of a heterogeneous system to be configurable at execution time. Such a configurable system allows for parallel processing and flexible pipe staging of various tasks.

At 502, a processor in a hard processor region of a programmable integrated circuit device identifies one or more tasks for assigning to an offload region of the programmable integrated circuit device. In particular, some tasks that are assigned to be performed by a system with a hard processor region (e.g., the HPS domain 102, for example) may be computationally intensive for the hard processor region to handle by itself. In this case, the hard processor region may offload certain tasks to an offload region (e.g., the FPGA domain 104, for example).

One example of a task that may be assigned from the hard processor region to the offload region is processing of security content. It may be desirable to offload processing of secure material so as to reduce a likelihood of a hacker attack on the integrated circuit device.

At 504, the processor in the hard processor region transmits an instruction to the offload region. As was described in relation to FIG. 1, the instruction may be transmitted from the offload driver 112 to the processor 114, and may include one or more pointers to memory locations in the shared memory 106. In particular, the processor 114 may be instructed by the offload driver 112 to load the appropriate data from the memory 106 into the memory 116. In some implementations, the memory 116 is partitioned in accordance with the instruction such that the offload nodes 118 access the desired data. Moreover, the offload driver 112 may transmit instruction data to the set of offload nodes 118 to configure the offload nodes 118 so that the desired connections are formed.

At 506, a plurality of offload nodes in the offload region are configured to perform the one or more tasks. Configuring the offload nodes includes configuring the data flow paths through at least a subset of the offload nodes. As used herein, an offload node may include a hard intellectual property (IP) block that is configurable at execution time. As was described in relation to FIGS. 1-4, the topology of the offload nodes 118, 218, 318, and 418 may be configured at execution time. The topology defines the various connections between pairs of the offload nodes and defines the inputs and outputs of the connections. By allowing the topology to be configured at execution time, the same set of offload nodes may be able to be configured in multiple ways depending on the desired functionality. In some implementations, the offload nodes are implemented as one or more hard IP blocks. These hard IP blocks may include a layout of reusable hardware having a specified application function. As was described in relation to FIGS. 1-4, examples of such specified application functions include cryptographic functions, frequency transform (FFT) functions, prime factorization functions, compression or decompression functions, mathematical functions, hash functions, and/or Ethernet functions.

In some implementations, the processor in the hard processor region and the processor in the offload region are configured to asynchronously access a memory in the hard processor region. As was described in relation to FIG. 1, the core CPU 108 and the processor 114 both have access to the same shared memory 106 in the HPS domain 102. Because of this, there is no need to pass physical copies of data stored in the memory 106 between the two domains. Instead, memory pointers may be passed between the two domains, thereby saving on transmission costs. In some implementations, a mutex locking mechanism may be used such that the two processors cannot concurrently access the memory 106. In this manner, the "zero copy" mechanism of the shared memory 106 avoids computing nodes to pass physical copies back and forth in the pipeline, thereby improving overall system performance.

Figure 6:
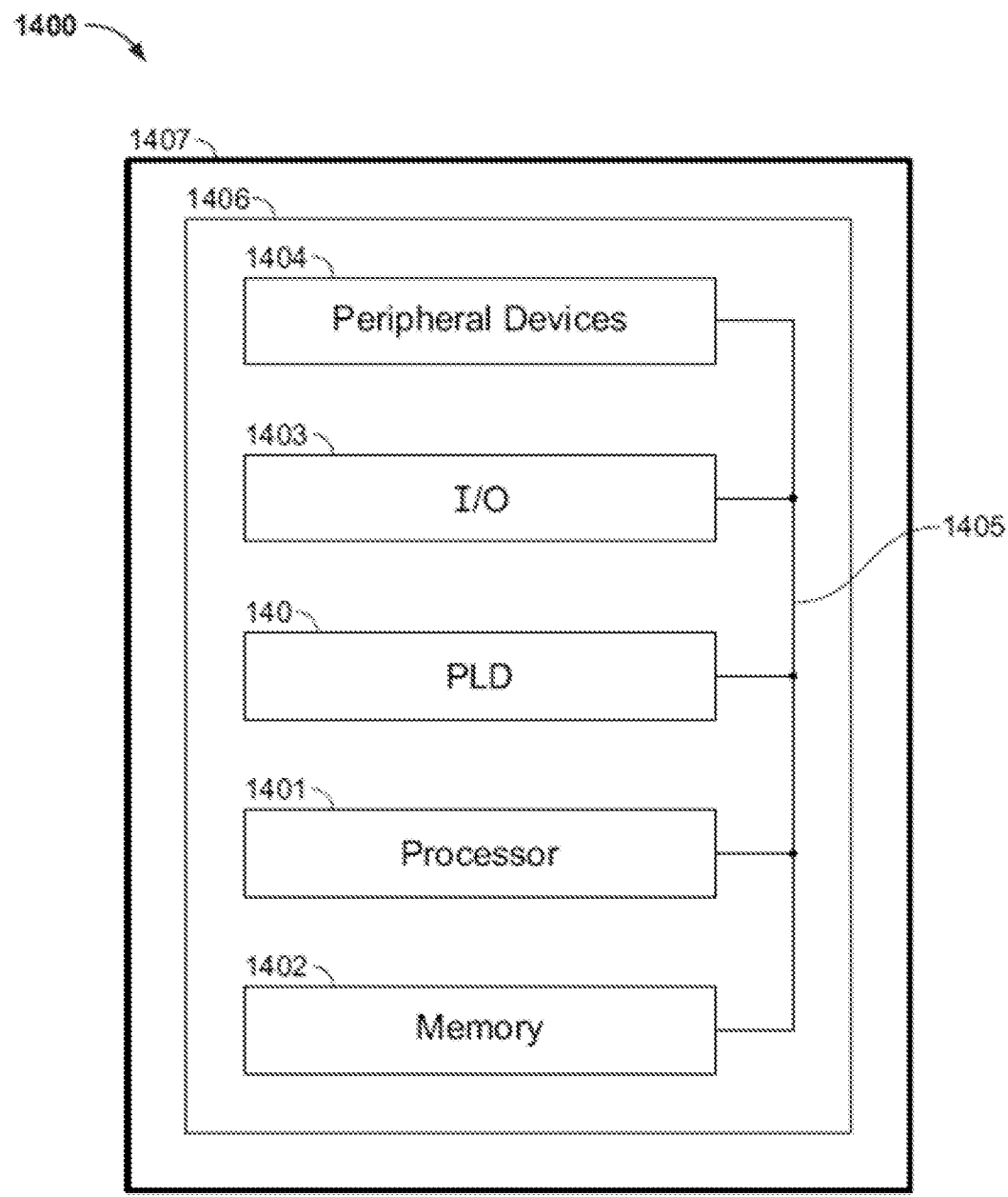
FIG. 6 is a simplified block diagram of an illustrative system employing a programmable logic device incorporating the present disclosure.

FIG. 6 is a simplified block diagram of an illustrative system employing a programmable logic device (PLD) 1400 incorporating the present disclosure. A PLD 1400 programmed according to the present disclosure may be used in many kinds of electronic devices. One possible use is in a data processing system 1400 shown in FIG. 6. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

PLD 1400 can be used in a wide variety of applications, such as computer networking, data networking, instrumentation, video processing, digital signal processing, or any other application where the advantage of using programmable or reprogrammable logic is desirable. PLD 140 can be used to perform a variety of different logic functions. For example, PLD 1400 can be configured as a processor or controller that works in cooperation with processor 1401. PLD 1400 may also be used as an arbiter for arbitrating access to a shared resource in the system. In yet another example, PLD 1400 can be configured as an interface between processor 1401 and one of the other components in the system. It should be noted that the system shown in FIG. 7 is only exemplary, and that the true scope and spirit of the invention should be indicated by the following claims.

Various technologies can be used to implement PLDs 1400 as described above and incorporating this invention.

The systems and methods of the present disclosure provide several benefits compared to existing systems. First, the present disclosure provides effective use of multi-core and many-core processors, which extends the usage of FPGAs in heterogeneous environments, in both personal and cloud computing applications. Second, dynamical runtime configuration of the modular offload nodes described herein allow for the main application CPU (i.e., the core CPU 108) to offload its computationally intensive tasks. This provides the flexibility needed to satisfy a wide variety of computing needs. Third, the hardware acceleration of pipelined tasks using the offload nodes significantly improves computational efficiency.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. A method of configuring a programmable integrated circuit device, the method comprising:
   identifying, by a processor in a hard processor region of the programmable integrated circuit device, one or more tasks for assigning to an offload region of the programmable integrated circuit device;
   determining a configuration of a plurality of offload nodes in the offload region to perform the one or more tasks, wherein each offload node of the plurality of offload nodes is configured to perform a specific function, wherein the configuration comprises a subset of the plurality of offload nodes and a loop back flow connection of a first offload node of the plurality of offload nodes, wherein the loop back flow connection comprises connecting an input of the first offload node to an output of the first offload node;
   transmitting, by the processor in the hard processor region, an instruction to the offload region to implement the configuration; and
   configuring the plurality of offload nodes in the offload region to implement the configuration by constructing a path over which data flows through the subset of the plurality of offload nodes to perform the one or more tasks based on the instruction.

2. The method of claim 1, wherein the processor in the hard processor region is a first processor, the method further comprising configuring both the first processor and a second processor in the offload region to asynchronously access a memory in the hard processor region.

3. The method of claim 1, wherein the one or more tasks include processing security content, and the processing of security content is assigned to the offload region to reduce a likelihood of a hacker attack on the programmable integrated circuit device.

4. The method of claim 1, further comprising modifying the plurality of offload nodes in the offload region by adding a new offload node to the plurality of offload nodes, removing an offload node from the plurality of offload nodes, or replacing an offload node in the plurality of offload nodes.

5. The method of claim 1, wherein determining the configuration of the plurality of offload nodes in the offload region to perform the one or more tasks comprises determining one or more specific functions to perform the one or more tasks and determining one or more offload nodes of the plurality of offload nodes that are configured to perform the one or more specific functions.

6. An integrated circuit device, comprising:
   a hard processor region having a processor that identifies one or more tasks and determines a configuration of a plurality of offload nodes in the offload region to perform the one or more tasks, wherein each offload node of the plurality of offload nodes is configured to perform a specific function, wherein the configuration comprises a subset of the plurality of offload nodes and a first connection between two offload nodes of the plurality of offload nodes and a back door connection between the two offload nodes, wherein the back door connection enables the two offload nodes to communicate with each other for testing or debugging purposes;
   an offload region coupled to the hard processor system, wherein:
      the one or more tasks are assigned to the offload region;
      the processor in the hard processor region transmits an instruction to the offload region to implement the configuration; and
      the offload region includes the plurality of offload nodes that implement the configuration by constructing a path over which data flows through the subset of the plurality of offload nodes to perform the one or more tasks based on the instruction.

7. The integrated circuit device of claim 6, wherein:
   the hard processor region comprises a memory;
   the processor in the hard processor region is a first processor; and
   both the first processor and a second processor in the offload region are configured to asynchronously access the memory.

8. The integrated circuit device of claim 6, wherein the one or more tasks include processing security content, and the processing of security content is assigned to the offload region to reduce a likelihood of a hacker attack on the integrated circuit device.

9. The integrated circuit device of claim 6, wherein the offload region is configured to be partially reconfigured to add a new offload node to the plurality of offload nodes, remove an offload node from the plurality of offload nodes, or replace an offload node in the plurality of offload nodes.

10. The integrated circuit device of claim 6, wherein at least one of the plurality of offload nodes is implemented as a hard intellectual property block, wherein the hard intellectual property block includes a layout of reusable hardware having a specified application function.

11. The integrated circuit device of claim 10, wherein the specified application function is selected from the group consisting of a cryptographic function, a frequency transform function, a prime factorization function, a compression or decompression function, a mathematical function, a hash function, and an Ethernet function.

12. The integrated circuit device of claim 6, wherein at least one field programmable gate array is used to implement the offload region.

13. The integrated circuit device of claim 6, wherein the offload region further comprises a second memory that is accessible to each offload node in the offload region.

14. The integrated circuit device of claim 13, wherein the second memory in the offload region is partitioned in accordance with the instruction.

15. An offload region on an integrated circuit device, comprising:
a plurality of offload nodes that are configured to perform one or more tasks identified by a first processor in a hard processor region of the integrated circuit device by implementing a configuration by constructing a path over which data flows through a subset of the plurality of offload nodes determined by the first processor based on the one or more tasks, wherein each offload node of the plurality of offload nodes is configured to perform a specific function, wherein implementing the configuration comprises replicating a first offload node of the plurality of offload nodes multiple times to enable parallel computing via the first offload node that is replicated multiple times;
a memory that each of the plurality of offload nodes are configured to access; and
a second processor that accesses the memory in the offload region and another memory in the hard processor region.

16. The offload region of claim 15, wherein the first processor and the second processor are configured to asynchronously access the other memory in the hard processor region.

17. The offload region of claim 15, wherein the plurality of offload nodes in the offload region are configured to be modified by adding a new offload node to the plurality of offload nodes, removing an offload node from the plurality of offload nodes, or replacing an offload node in the plurality of offload nodes.

* * * * *